J. C. BANDINI.
SIFTING SHOVEL.
APPLICATION FILED APR. 12, 1919.
1,341,874.
Patented June 1, 1920.
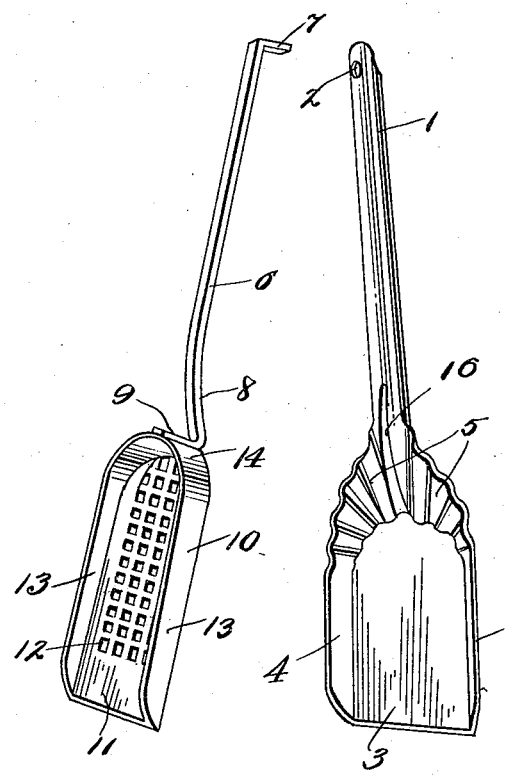
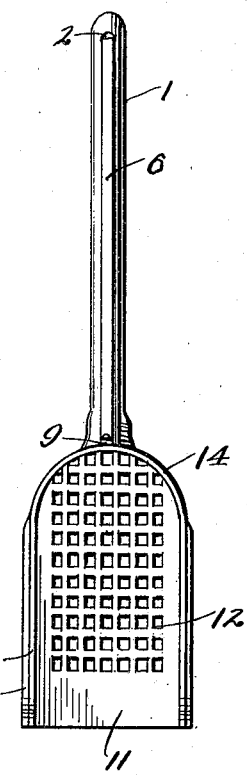
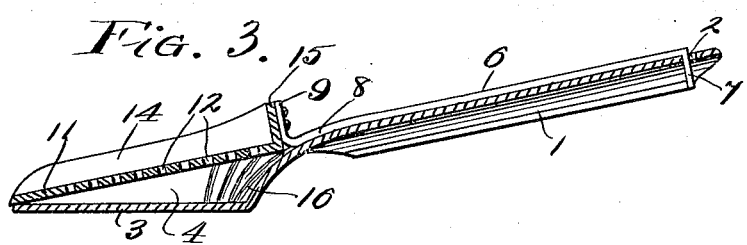
WITNESS:
INVENTOR.
Julius C. Bandini
BY
ATTORNEY.

UNITED STATES PATENT OFFICE.

JULIUS C. BANDINI, OF CORONA, NEW YORK.

SIFTING-SHOVEL.

1,341,874.  Specification of Letters Patent.  Patented June 1, 1920.

Application filed April 12, 1919. Serial No. 289,502.

*To all whom it may concern:*

Be it known that I, JULIUS C. BANDINI, a citizen of the United States, residing at Corona, in the county of Queens and State of New York, have invented certain new and useful Improvements in Sifting-Shovels, of which the following is a specification.

The invention relates to sifting shovels and has for its primary object the provision of sifting means which may be associated in a practical manner with the ordinary shovel without necessitating any extensive modifications of the latter.

Another object of the invention is to provide a shovel having a sifting means which will effectively separate smaller particles such as ashes dust and the like from the solid particles such as coal.

Another object of the invention resides in the specific construction, combination, and arrangement of parts whereby the invention is rendered practical, and capable of being manufactured at a reasonable cost.

The foregoing objects as well as others will be more readily understood from the following description and drawings, in which drawings, Figure 1 is a perspective view of the shovel and sifting member detached, Fig. 2 is a top plan view of the shovel and sifting member assembled, and Fig. 3 is a longitudinal sectional view taken on the line 3—3 of Fig. 2.

Referring to the drawings by numerals, 1 indicates the handle of the shovel which is provided adjacent its free end with an opening 2 and at its opposite end with the blade 3 having the usual side flanges 4 converging inwardly toward the handle at the rear end of the blade as indicated at 5.

The sifting member comprises a handle 6 having its free end bent at right angles as at 7 and adapted to enter the opening 2 in the handle 1 as clearly shown in Fig. 2. Adjacent its opposite end, this handle 6 is curved longitudinally as indicated at 8 and is then bent at right angles as at 9 and secured to the sifting pan 10. The sifting pan 10 consists of a bottom wall 11 having a plurality of perforations 12 formed therein. Sides 13 and the curved rear end 14 integral with said sides complete the pan. When using this invention, the hook end 7 of the handle member 6 is inserted through the opening 2 of the handle member 1. As clearly shown in Fig. 2 the handle 6 lies flat against the handle 1 at all points of contact as the curved portion 8 of handle 6 is disposed within a curved longitudinally extending groove 16 provided therefor in handle 1. The sifting pan 10 rests upon the shovel blade 3 and is supported at an inclined angle thereon as clearly shown in Fig. 3. When using the invention as thus assembled to remove ashes or other refuse from the bottom of a stove or furnace, it will be obvious that the ashes will pass through the apertures 12 in the bottom of the sifting pan onto the shovel blade 3, while the solid particles such as coal will be retained within the pan 10. In this manner, the coal retained on the pan can be placed to one side by removing the pan from the shovel while the ashes deposited on the shovel blade can be placed on the other side thus doing away with the necessity of a separate sifting operation.

Having thus fully described my invention what I claim is:

1. The combination with a shovel, of a sifting member comprising a perforated pan supported upon the shovel in spaced relation thereto, a handle member having one end thereof secured to said pan and the opposite end bent to provide a hook, said hook being engageable with the handle of the shovel to retain the pan in position.

2. In combination, a shovel having a handle provided adjacent one end with an opening and at the opposite end with a short longitudinal groove, a sifting member comprising a perforated pan supported upon the blade of the shovel in spaced relation thereto, a handle carried by said perforated pan and having one end thereof bent to provide a hook adapted to pass through the opening in the shovel handle, said sifting member handle being provided adjacent its opposite end with a curved portion fitting into the groove in the shovel handle.

3. In combination, a shovel having a handle provided adjacent one end with an opening, a groove at the other end thereof, a perforated pan supported within the blade of the shovel in spaced relation thereto, a handle member carried by said pan having at one end a hook for interlocking engagement with the opening in the handle of the shovel, and the opposite end of said sifting member handle being curved to fit and conform to the shape of said groove to prevent lateral movement of said pan.

In testimony whereof, I have affixed my signature in the presence of two witnesses.

JULIUS C. BANDINI.

Witnesses:
 HOMER QUARTIELLE,
 ANTONIO PATTRINIERI.